United States Patent

Katbi et al.

[11] Patent Number: 5,511,911
[45] Date of Patent: Apr. 30, 1996

[54] CUTTING INSERT

[75] Inventors: Karl Katbi, Troy; Ken Noggle, West Bloomfield; Tony Lowe, Royal Oak; John Patterson, Hazel Park, all of Mich.

[73] Assignee: Valenite Inc., Madison Heights, Mich.

[21] Appl. No.: 270,621

[22] Filed: Jul. 5, 1994

[51] Int. Cl.$^6$ ................................................... B23B 27/22
[52] U.S. Cl. ............................................ 407/114; 407/116
[58] Field of Search ................................... 407/113, 114, 407/115, 116, 100

[56] References Cited

U.S. PATENT DOCUMENTS

| | | | |
|---|---|---|---|
| 4,963,060 | 10/1990 | Niebauer et al. | 407/116 X |
| 4,969,779 | 11/1990 | Barten | 407/114 |
| 5,192,171 | 3/1993 | Ther et al. | 407/114 |
| 5,330,296 | 7/1994 | Beeghly et al. | 407/114 |
| 5,375,948 | 12/1994 | Lindstedt | 407/116 |

Primary Examiner—S. Thomas Hughes
Attorney, Agent, or Firm—John W. Gregg

[57] ABSTRACT

A cutting insert for metal cutting includes a body portion of a generally polygonal shape having a cutting end including a front end wall, sides, and top and bottom surfaces. The intersection of the top surface, end wall and sides forming a cutting edge. The top surface includes a cutting land of a generally concave shape about an axis longitudinally extending between the sides and sloping downwardly and inwardly from the cutting edge, a chipgroove area adjoining the cutting land and extending inwardly therefrom and disposed at a lower elevation than the cutting edge, and an upsloping chipbreaker portion adjoining the chipgroove area and the cutting land and leading to a plateau disposed at a higher elevation than the cutting edge and chipgroove area. The chipbreaker portion is configured symmetrically about the axis and includes a forwardly extending fingerlike projection on either side of and continuous with a rearwardly recessed region bisected by the axis.

13 Claims, 3 Drawing Sheets

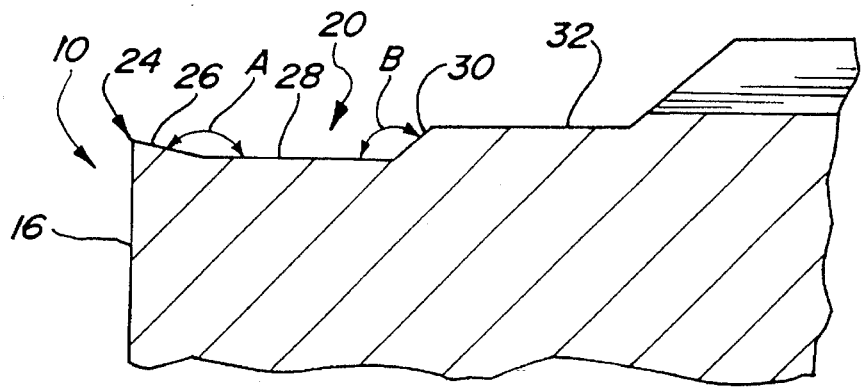
_Fig - 3_
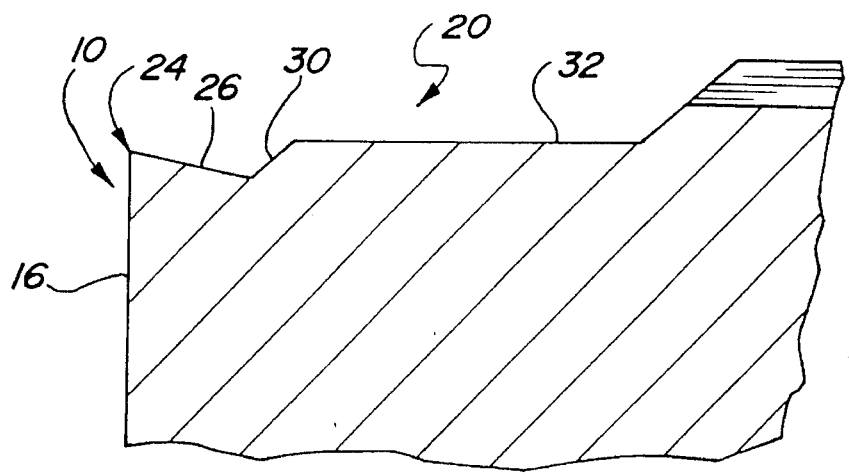
_Fig - 4_
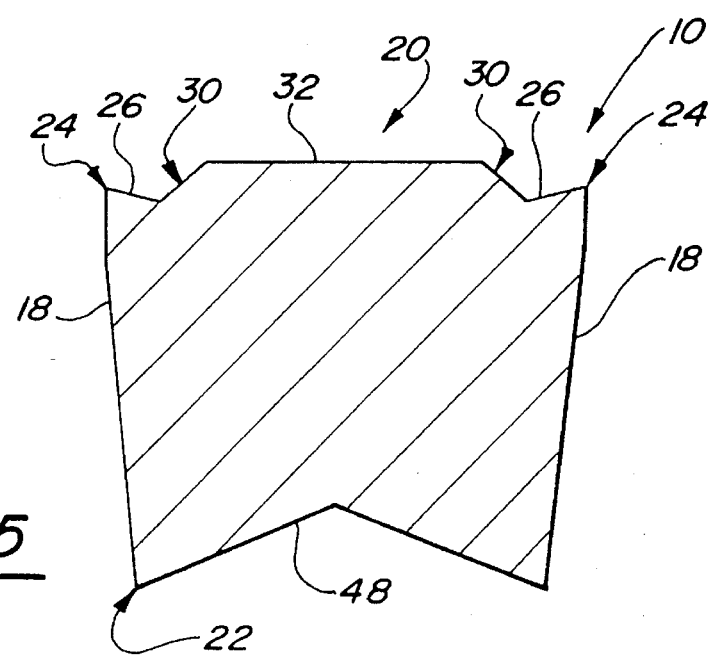
_Fig - 5_

CUTTING INSERT

FIELD OF THE INVENTION

This invention relates to cutting inserts for metal cutting and more particularly to a cutting insert having a chip control geometry formable into the insert that reduces cutting pressures and provides chip control over a wide range of parameters and a broader application range.

BACKGROUND OF THE INVENTION

It is known in the art relating to metal cutting to use disposable cutting inserts which are detachably clamped on a holder and discarded when they become dull or chipped. Throw away inserts are usually reversible so that an insert can be provided with at least two cutting ends for selective presentation of the cutting end to the cutting position.

Conventional insert design requires substantial amounts of grinding along the cutting end and insert locating surfaces. In addition to being an expensive part of the insert manufacturing process, the grinding operation does not allow the cutting end to be fabricated with a cutting land having a positive shear cutting angle. With these inserts and their geometry, the pressure against the workpiece during cutting quickly wears out the insert.

SUMMARY OF THE INVENTION

The present invention provides a cutting insert having a pressed-in cutting end geometry that provides a positive shear cutting angle on the cutting land which reduces cutting pressure and increases insert life. This geometry gives the insert a broader application range for grooving aluminum, and low carbon materials and makes the insert versatile in turning and profiling applications where chip control is required.

The present invention also provides a cutting insert geometry that eliminates the heretofore required grinding operations necessary to qualify the required locating surfaces while improving the insert maximum holding power with minimum clamping pressures during grooving and profiling operations.

Accordingly, it is an object of the invention to provide a cutting insert having a cutting geometry that is versatile for use over a variety of operating parameters while being manufacturable at reduced cost.

Another object of the invention is to provide a cutting insert that generates a watcher spring type chip which is thinner than width of cut and thicker than feed rate for easy disposal from the grooving operation.

A specific object of the invention is to provide a cutting insert of a polygonal shape having a cutting end comprising a front end wall, sides, and top and bottom surfaces. The intersection of the top surface, end wall and sides forms a cutting edge that engages a workpiece during a chip forming operation.

The top surface of the insert comprises a cutting land of a generally concave shape about an axis longitudinally extending between the sides and sloping downwardly and inwardly from the cutting edge. A chipgroove area adjoins the cutting land and extends inwardly therefrom. The chipgroove area is disposed at a lower elevation than the cutting edge.

An upsloping chipbreaker portion adjoins the chipgroove area and the cutting land and leads to a plateau disposed at a higher elevation than the cutting edge and the chipgroove area. The chipbreaker portion is configured generally symmetrically about the longitudinally extending axis. The chipbreaker portion includes a forwardly extending fingerlike projection on either side of and continuous with a rearwardly recessed region bisected by the axis.

The chipbreaker portion is linearly sloping and forms an obtuse angle with the chipgroove area. The cutting land is generally linearly sloping and forms an obtuse angle with the chipgroove area. The chipgroove area has a convexly curved leading edge projecting toward the end wall adjoining the cutting land and extending between the chipbreaker forwardly extending fingerlike projections. Preferably, the curved leading edge is symetrical about the longitudinally extending axis and the concave shape of the cutting land is conical and diverging in a direction inwardly from the insert end.

These and other features and advantages of the invention will be more fully understood from the following detailed description of the invention taken together with the accompanying drawings.

BRIEF DESCRIPTION OF THE DRAWINGS

In the drawings:

FIG. 3 is a sectional view taken along lines 3—3 in FIG. 2;

FIG. 4 is a sectional view taken along lines 4—4 in FIG. 2;

FIG. 5 is a sectional view taken along lines 5—5 in FIG. 2; and

DETAILED DESCRIPTION OF THE INVENTION

Figure 1:
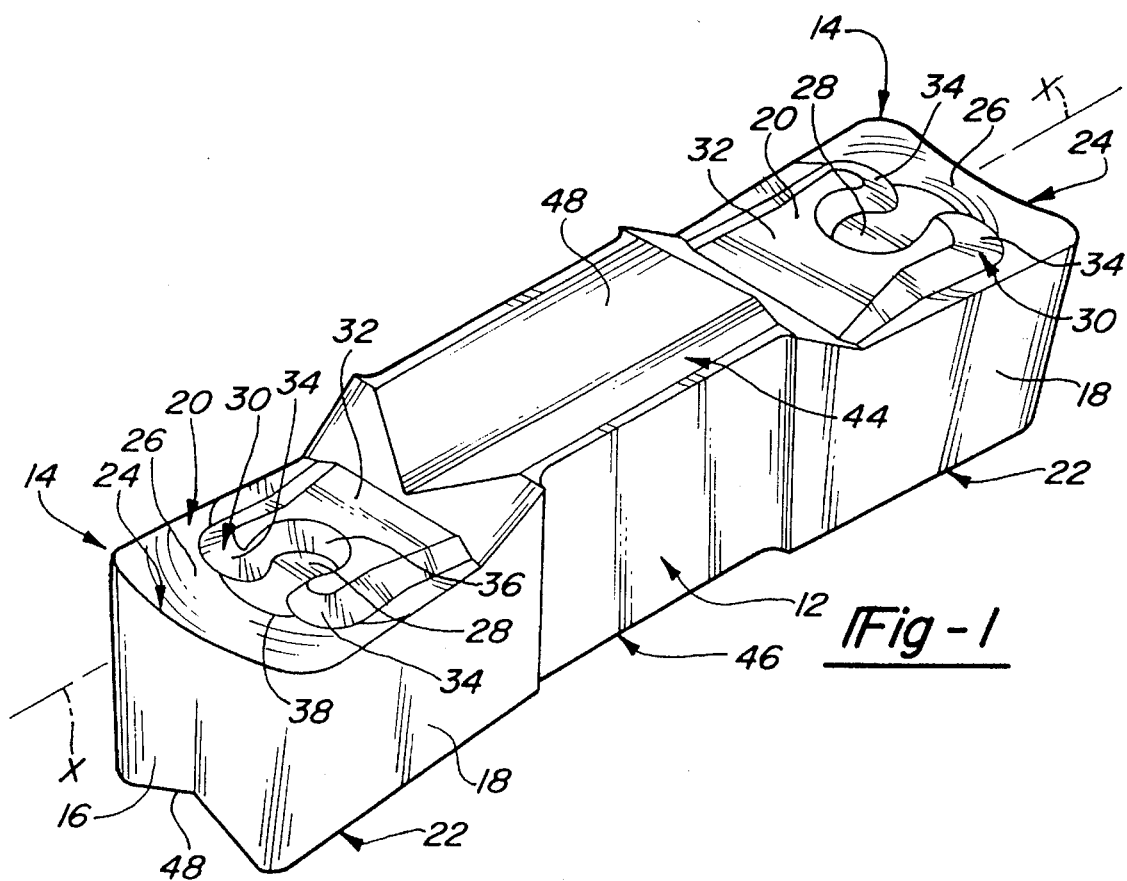
FIG. 1 is a perspective view of a cutting insert constructed in accordance with the present invention.

Referring now to the drawings in detail, numeral 10 generally indicates a cutting insert for use with cutting tools for cut-off, grooving, and turning of aluminum and low carbon materials at low to medium cutting speeds, at low to medium feed rates.

In FIG. 1 there is shown an insert 10 formed of a generally polygonal shape adapted to be clampingly received in a holder as is well known in the art. Insert 10 includes a body portion 12 having two cutting ends 14 on opposite ends of the body portion. Each cutting end includes a front end wall 16, sides 18 and top and bottom surfaces 20,22 respectively. The intersection of the top surface 20, end wall 16 and sides 18 form a cutting edge 24.

As illustrated in FIGS. 1 thru 6, the insert 10 includes a cutting land 26 of a concave shape about an axis X-X longitudinally extending between the sides 18. The cutting land 26 is of a linear shape sloping downwardly and inwardly from the cutting edge 24. A chipgroove area 28 adjoins the cutting land 26 and extends inwardly from the cutting land. The chipgroove area 28 is at a lower elevation than the cutting edge 24. An angle A formed between the cutting land 26 and chipgroove area 28 is obtuse and generally in the range of between 164–174 degrees. This geometry provides a relatively positive shear angle for the cutting land 26 while maintaining superior cutting edge 24 strength. Preferably, the concave shape of the cutting land 26 is a conical shape diverging in a direction inwardly from the end wall 16.

The angle of the cutting land 26 reduces force distribution along the front wall 16 and sides 18 of the insert 10 during grooving and profiling operations and initiates the start of chipbreaking by directing and bending exiting workpiece material toward the center of the insert 10 and away from the walls of the workpiece. The concave shape of the cutting land 26 assists in the directing of the exiting workpiece material, maximizes chip control performance at lower feed rates and improves the surface finish along the walls of a groove. The concave shape of the cutting land 26 also allows the insert 10 to be used when backfacing from the bottom of a groove.

In addition, the lower elevation of the chipgroove area 28 relative to the cutting edge 24, and generally in the range of between 0.0051 and 0.0061 inches, allows the exiting workpiece material to make contact at the lower portion of the cutting land 26 which aids in chip control at lower feed rates during shallow grooving operations.

With continued reference to FIGS. 1–6, the insert 10 includes an upsloping chipbreaker portion 30 adjoining the chipgroove area 28 and cutting land 26. Upsloping chipbreaker portion 30 leads to a plateau 32 disposed at a higher elevation than the cutting edge 24 and chipgroove area 28, and generally in the range of 0.0089/0.0099 and 0.014/0.016 inches respectively.

Figure 2:
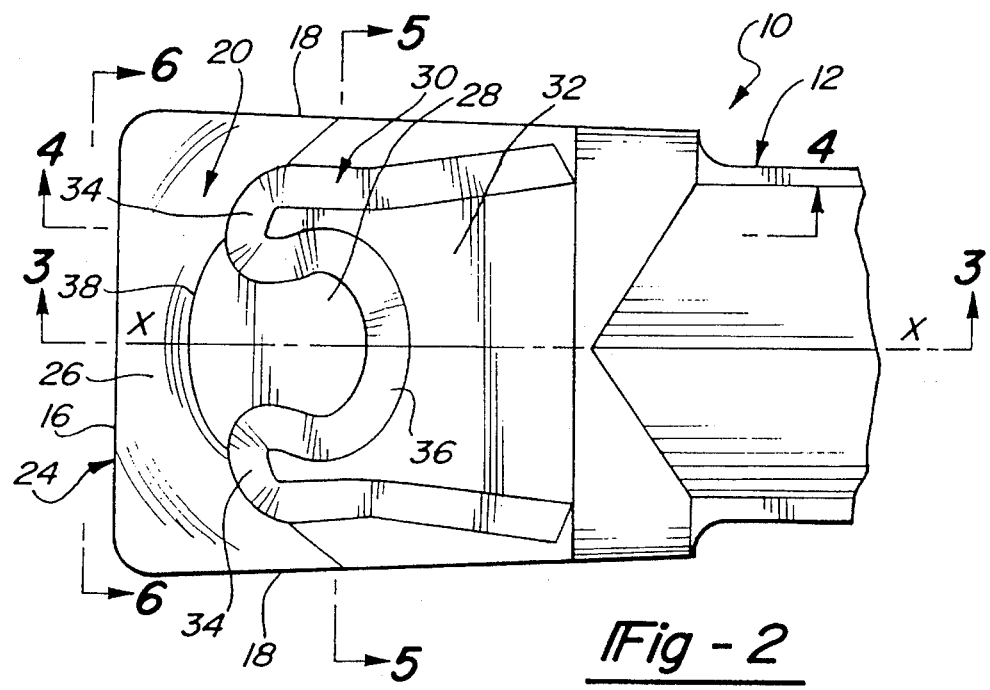
FIG. 2 is a sectional plan view of one end of the insert of FIG. 1.
Figure 6:
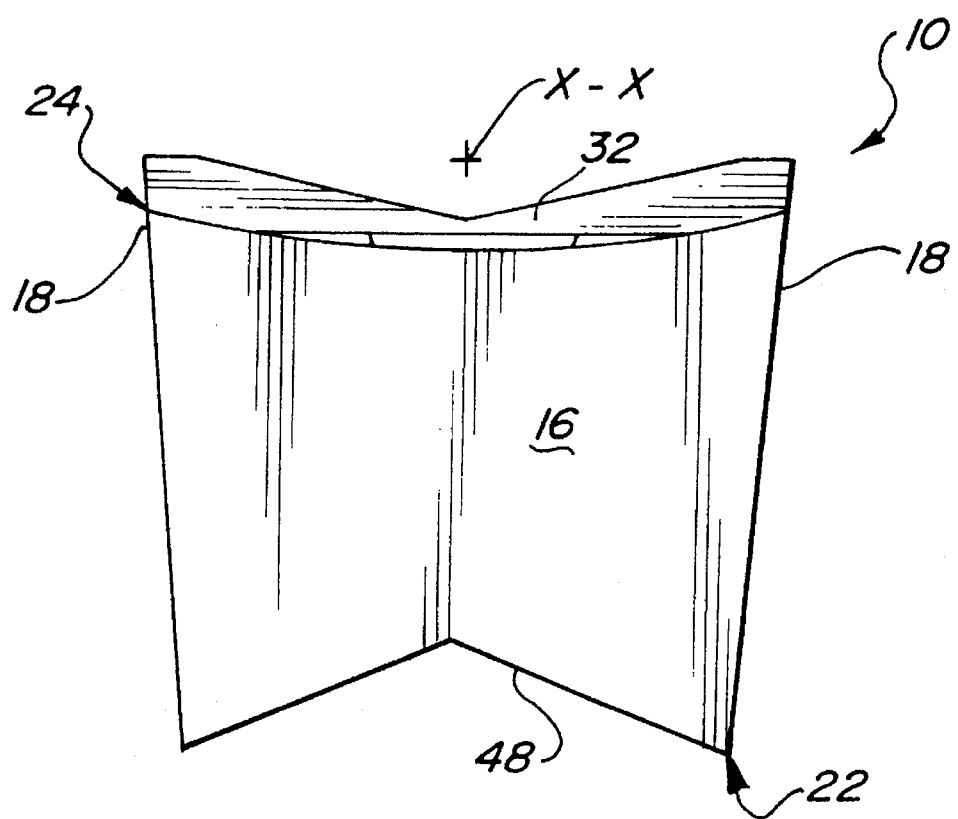
FIG. 6 is an end view of the cutting insert in FIG. 1.

As illustrated in FIGS. 1 and 2, the chipbreaker portion 30 is configured symmetrically about axis X-X. The chipbreaker portion 30 includes forwardly extending fingerlike projections 34 on either side of and continuous with a rearwardly recessed region 36 bisected by axis X-X. Preferably the recessed region 36 is generally circular and C-shaped. The chipgroove area 28 has a convexly curved leading edge 38 projecting toward end wall 16 extending symetrically about axis X-X between forwardly extending fingerlike projections 34.

The planar configuration of the chipgroove area 28 increases the stress/strain within the exiting workpiece material prior to its contact with the upsloping chipbreaker portion 30 which is linearly sloping and forms an obtuse angle B with the chipgroove area, generally in the range of 130–150 degrees. The convexly curved leading edge 38 enhances the deflection imparted to the exiting workpiece material as it moves from the cutting land 26 to the chipgroove area 28 and acts to protect the chipbreaker portion 30 from cratering and chipping as the material moves over the chipbreaker portion.

The steepness of the chipbreaker portion 30 relative to the chipgroove area 28 provides for maximum chipbreaking capability during grooving operations at both lower/higher feed rates and groove depths. When grooving at low feed rates and shallow groove depths, decreasing angle B provides maximum deflection of the exiting workpiece material. During deeper grooving at high feed rates, decreasing angle B provides for maximum protection against chip wash/cratering of the chipbreaker portion 30 which can result in loss of chip control before the insert has reached its normal wear characteristic.

Referring to FIGS. 1 and 2, the form of the chipbreaker portion 30 provides for maximum bending of the exiting workpiece material during grooving operations. Exiting workpiece material initially contacts the fingerlike projections 34 and bends inwardly away from the walls of the groove being formed, and into the recessed region 36. This bending action of the exiting material increases the stress/strain in the material allowing it to break or curl. The relatively large width of the fingerlike projections 34 together with the relatively large radius of the recessed region 6 provides protection against chip wash of the chipbreaker portion 30. As illustrated in FIGS. 1,2 and 5, the chipbreaker portion 30 rises out of the cutting land 26 along the sides of the insert 10 which increases chip control during turning operations.

Referring again to FIG. 1, the insert body portion 12 includes a top and bottom surface 44,46 having a longitudinally extending recess 48 of an inverted V-shape formed therein each surface between cutting ends 14 for locating the insert. The inverted V-shape recesses 48 oppose each other and enhance the insert 10 performance by maximizing its holding power with minimum clamping pressure during grooving and profiling operations.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A cutting insert of a generally polygonal shape having a cutting end comprising a front end wall, sides, and top and bottom surfaces, the intersection of said top surface, end wall and sides forming a cutting edge, said top surface comprising:

a cutting land of a generally conical shape diverging inwardly from the front end wall and linearly sloping downwardly and inwardly from said cutting edge;

a chipgroove area intersecting said cutting land below the cutting edge and extending inwardly therefrom;

an upsloping chipbreaker portion adjoining said chipgroove area and said cutting land and leading to a plateau disposed at a higher elevation than said cutting edge and said chipgroove area, said chipbreaker portion configured generally symmetrically about the longitudinal axis bisecting the top surface and including two forwardly extending projections, one on each side of and continuous with a rearwardly recessed region bisected by said longitudinal axis.

2. The invention of claim 1 wherein said chipbreaker portion is generally linearly sloping and forms an obtuse angle with said chipgroove area.

3. The invention of claim 2 wherein said obtuse angle is in the range of 130–150 degrees.

4. The invention of claim 3 wherein said cutting land forms an obtuse angle with said chipgroove area whereby positive shear is provided during cutting.

5. The invention of claim 4 wherein said obtuse angle formed by the cutting land and chipgroove area is in the range of 164–174 degrees.

6. The invention of claim 4 wherein the elevational difference between said cutting edge and chipgroove area is generally in the range of between 0.0051 and 0.0061 inches.

7. The invention of claim 6 wherein the elevational difference between said cutting edge and plateau is generally in the range of between 0.0089 and 0.0099 inches.

8. The invention of claim 7 wherein the elevational difference between said plateau and chipgroove area is in the range of between 0.014 and 0.016 inches.

9. The invention of claim 1 wherein said cutting insert includes two cutting ends on opposite ends of a polygonal shaped body portion.

10. The invention of claim 9 wherein said body portion includes top and bottom surfaces having a longitudinally extending recess formed therein each surface between said cutting ends for locating said insert.

11. The invention of claim 1 wherein the intersection of the cutting land and the chipgroove area curves rearwardly from said front end wall and outwardly toward said sides, said curve being symmetrical relative to said longitudinal axis.

12. The invention of claim 11 wherein said projections interrupt the curved intersection of said cutting land and said chipgroove area.

13. The insert of claim 1 wherein the intersection of the chipbreaker portion and the chipgroove area defines a curve projecting inwardly between said projections.

* * * * *